Nov. 3, 1970  T. J. O'CONNOR  3,538,290

APPARATUS FOR ELECTRO-EROSION MACHINING

Filed April 18, 1967  2 Sheets-Sheet 1

INVENTOR
THOMAS J. O'CONNOR
BY
ATTORNEYS

Nov. 3, 1970 T. J. O'CONNOR 3,538,290
APPARATUS FOR ELECTRO-EROSION MACHINING
Filed April 18, 1967 2 Sheets-Sheet 2

INVENTOR
THOMAS J. O'CONNOR
BY
ATTORNEYS 3,538,290
APPARATUS FOR ELECTRO-EROSION
MACHINING
Thomas J. O'Connor, 100 Morgan Road,
Ann Arbor, Mich. 48104
Filed Apr. 18, 1967, Ser. No. 631,809
Int. Cl. B23p 1/14
U.S. Cl. 219—69     2 Claims

ABSTRACT OF THE DISCLOSURE

Electrical machining apparatus including servo feed mechanism responsive to fluid pressure between the electrode and workpiece for maintaining a predetermined space between the electrode and workpiece including improved hydraulic feed apparatus for moving the electrode and workpiece relative to each other and fluid bypass structure for maintaining a predetermined fluid pressure between the electrode and workpiece.

BACKGROUND OF THE INVENTION

The invention relates to electrical machining and refers more specifically to machining wherein an electrode and workpiece are maintained in predetermined spaced relation, an electrical signal is passed between the electrode and workpiece, and a fluid is maintained in the gap between the electrode and workpiece.

In the past the gap between the electrode and workpiece in such apparatus has normally been maintained by sensing a parameter or parameters of the electrical signal across the gap between the workpiece and electrode and providing electro-mechanical or electro-hydraulic means responsive to the electrical signal across the gap to move the workpiece and electrode relatively as machining progressed. The pressure of the fluid between the electrode and workpiece has varied in the past as the gap has varied in dimension.

SUMMARY OF THE INVENTION

In accordance with the present invention the pressure of the fluid between the electrode and workpiece is sensed and the electrode and workpiece are moved relative to each other in accordance with the sensed pressure between the electrode and workpiece to maintain a predetermined gap between the electrode and workpiece. The sensed pressure between the electrode and workpiece is used in accordance with the invention to regulate an improved hydraulic system for moving the electrode relative to the workpiece. Further, in accordance with the invention the pressure of the fluid between the electrode and workpiece is regulated to provide desired cutting characteristics.

DESCRIPTION OF THE PREFERRED EMBODIMENTS

Figure 1:
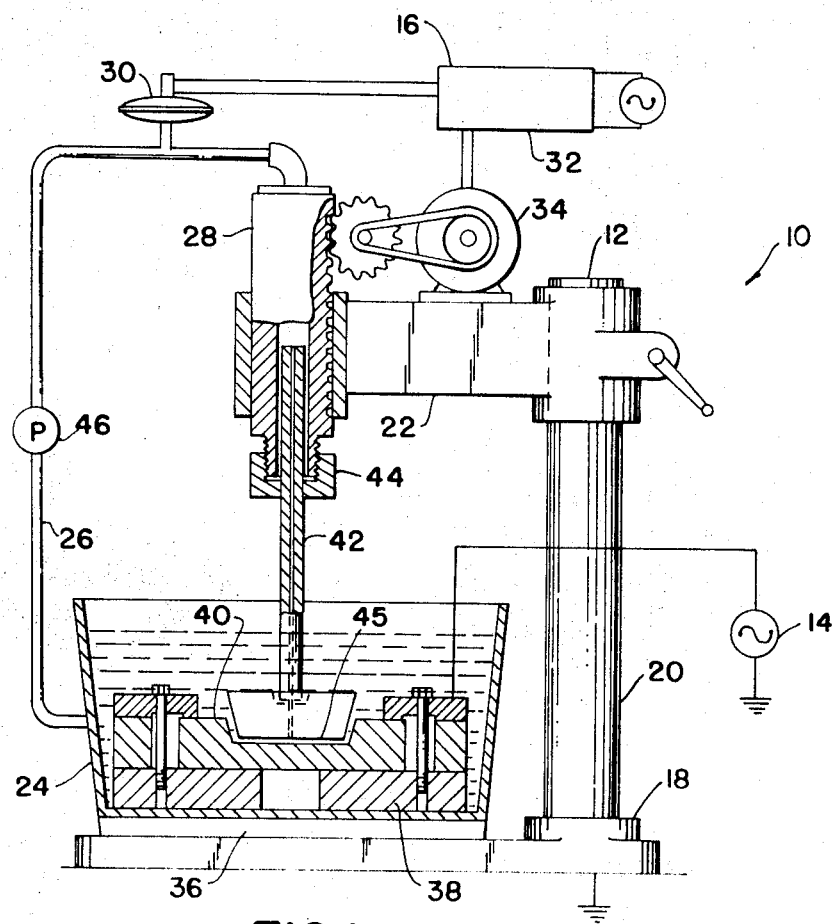
FIG. 1 is a partly schematic, partly diagrammatic view of electrical discharge machining apparatus, partly broken away and constructed in accordance with the invention.

As shown in FIG. 1 the electrical discharge machining apparatus 10 includes the machine includes the machine tool 12, power supply 14 and servo mechanism 16. The machine tool 12 further includes the base 18, post 20 and arm 22 connected as shown in FIG. 1, along with the work tank 24, fluid circulating system 26, and electrode supporting head 28. The servo mechanism 16 includes the pressure sensing apparatus 30, bridge circuit 32 and motor 34. The power supply 14 forms no part of the present invention and will not therefore be considered in detail herein.

It will be understood however that in accordance with electrical machining procedures, the power supply 14 is a pulsed power supply in conjunction with the electrical discharge machining apparatus 10. A direct power supply would normally be used in conjunction with electro-chemical machining apparatus.

As illustrated in FIG. 1, the arm 22 is supported for movement along the post 20 in the usual manner. The tank 24 is positioned on the insulating pad 36 on base 18 and includes therein mounting structure 38 for securing the workpiece 40 in position in the tank 24 beneath the electrode 42 supported in the chuck 44 on head 28.

The fluid circulating system 26 includes a pump 46 for pumping a dielectric fluid, such as oil, from the tank 24 through the head 28, the hollow electrode 42 and into the gap 45 between the electrode and workpiece. It will be understood that in accordance with the usual hydraulic principles the pressure of the dielectric fluid present in the head 28 will depend on the orifice through which it can discharge into the tank 24 which is determined by the gap between the electrode 42 and workpiece 40 maintained by the servo mechanism 16.

Figure 2:
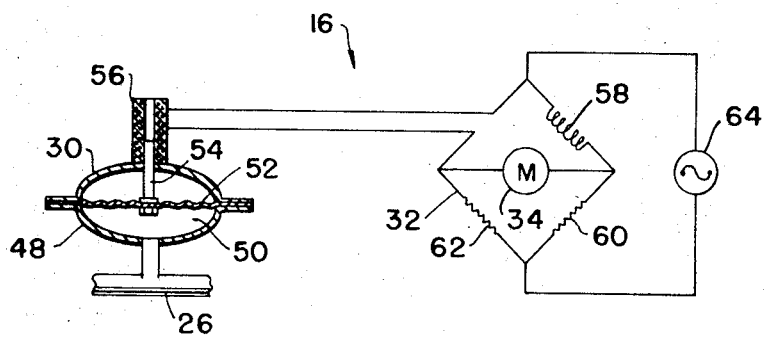
FIG. 2 is an enlarged partly schematic and partly broken away diagrammatic illustration of the pressure sensing means and the electrical circuit for operating the motor of the electrical discharge machining apparatus of FIG. 1.

In accordance with the invention the gap between the electrode 42 and workpiece 40 is maintained by the servo mechanism 16 illustrated best in FIG. 2 by the development of an electrical signal proportional to the dielectric pressure in the head 28 through sensing apparatus 30 and causing the motor 34 to operate at a speed and in a direction to maintain a desired dielectric pressure.

As shown the sensing apparatus 30 includes a diaphragm housing 48 having a lower chamber 50 in communication through conduit 26 with the dielectric fluid in the head 28. The pressure of the dielectric fluid in the chamber 50 acts on the diaphragm 52 of sensing means 30 to move the core 54 of the linear variable differential transformer relative to the coil 56 thereof whereby the electrical resistance of the coil 56 is varied in accordance with the usual operation of linear variable differential transformers. The bridge circuit 16 includes the four impedances 56, 58, 60 and 62 connected as shown in FIG. 2 across the source of alternating electrical energy 64. The motor 34 thus receives current in accordance with the pressure of the dielectric fluid between the electrode and workpiece.

With this pressure responsive gap control mechanism particularly accurate machining can be accomplished without the current fluctuations and head movement variations normal in other methods of controlling the movement of an electrode with respect to a workpiece in electrical machining apparatus.

Figure 3:
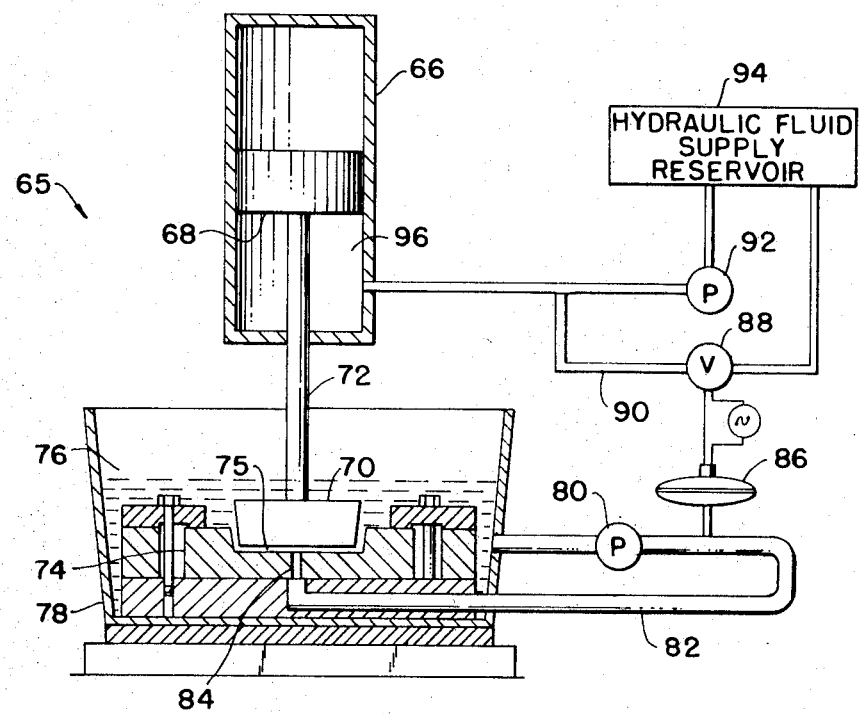
FIG. 3 is a partly schematic, partly diagrammatic broken away illustration of a modfiication of the electrical discharge machining apparatus illustrated in FIG. 1.

The modified structure illustrated in FIG. 3 is provided to take the place of the servo mechanism 16 and head structure 28 of the electrical discharge machining apparatus of FIG. 1.

In the electrical discharge machining apparatus 65 of FIG. 3 a hydraulic cylinder 66 and piston 68 are provided for moving an electrode 70 secured to piston rod 72 toward and away from the workpiece 74 positioned beneath the dielectric fluid 76 in the work tank 78. In the structure of FIG. 3 the dielectric fluid 76 is pumped from the tank 78 through pump 80, conduit 82 and the orifice 84 in the workpiece 74 into the gap 75 between the workpiece 74 and electrode 70.

The pressure sensing apparatus 86 which may be the same as apparatus 30 senses the pressure of the dielectric fluid between the workpiece 74 and electrode 70 and provides a variable electrical signal in response thereto to the variable orifice valve 88 in conduit 90. Conduit 90 bypasses the pump 92 which pumps hydraulic fluid from the hydraulic fluid supply tank 94 to the lower chamber 96 of the piston and cylinder structure 66 and 68.

Thus in operation of the electrical discharge machining apparatus illustrated in FIG. 3, if the electrode 70 gets too close to the workpiece 74, the pressure of the dielectric fluid sensed by the pressure sensing apparatus 86 will be high so that the electric signal sent to the variable restriction valve 88 will cause the valve 88 to be more restricted and bypass less of the fluid pumped by the constant volume pump 92 back to the reservoir 94 whereby additional fluid will be passed into the chamber 96 to raise the electrode 70 relative to the workpiece 74.

Conversely, if the electrode 70 is not close enough to the workpiece 74, pressure in the pressure sensing apparatus 86 will cause wider opening of the valve 88 and draining of some of the hydraulic fluid in the chamber 96 back to the hydraulic fluid supply reservoir and consequent downward movement of the electrode 70 under force of gravity due to the weight of the piston 68, piston rod 72 and electrode 70.

Figure 4:
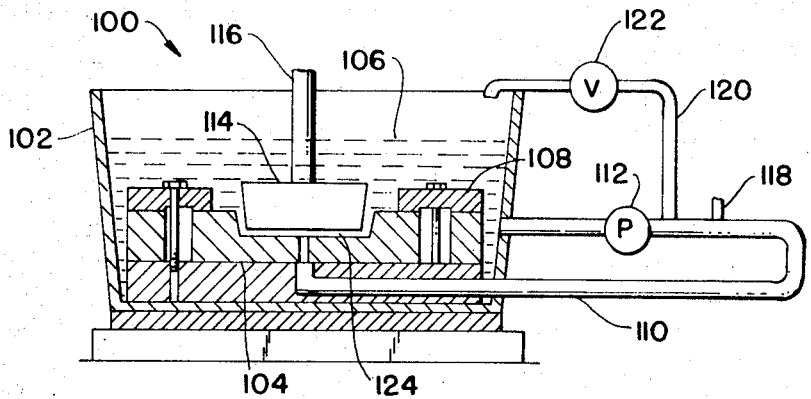
FIG. 4 is a partly schematic, partly diagrammatic broken away illustration of a modification of the electrical discharge machining apparatus illustrated in FIG. 3.

The modified electrical machining structure 100 illustrated in FIGURE 4 may be used to maintain a predetermined fluid pressure between an electrode and workpiece which will increase cutting efficiency. The structure 100 may also be used in conjunction with the structures of FIGS. 1 and 3 to, for example, maintain the fluid pressure between the electrode and workpiece between predetermined limits.

The structure 100 is exactly the same as the structure 65 of FIG. 3 in that it includes a tank 102, workpiece 104, dielectric 106, workpiece mounting structure 108, dielectric conduit 110 and pump 112. When used in conjunction with the structure of FIGURE 3, the electrode 114 is supported from the piston rod 116 and the conduit 118 is provided to sense the pressure in the conduit 110 in conjunction with pressure sensing apparatus, such as pressure sensing apparatus 86 of FIG. 3.

In addition the structure of FIG. 4 includes the dielectric fluid return conduit 120 having the pressure responsive valve 122 therein. Valve 122 may be a simple pressure relief valve in the form of a check valve or it may be a pressure responsive flow control valve.

In operation of the modified structure 100, with valve 122 a pressure relief valve, excess fluid pumped by pump 112 providing a pressure higher than that desired in the gap 124 would cause the valve 122 to open when the pressure in the conduit 110 exceeded a predetermined pressure. Similarly with valve 122 being a pressure responsive flow control valve, when the pressure in the conduit 110 is such that it creates a pressure in the gap 124 which is undesirable, the valve 122 will open or close sufficient to vary the fluid flow through conduit 120 back to tank 102 to bring the pressure in the gap 124 back to the desired pressure or between the desired limits.

Thus the pressure of the fluid in the gap between the electrode and workpiece in electrical machining has been found to be not only capable of being sensed to regulate the gap between the electrode and workpiece but has also been found to require control in optimum machining operations. In other words, to provide optimum machining it has been found that the fluid pressure in the gap between the electrode and workpiece should be controlled as well as the actual spacing of the electrode and workpiece.

While one embodiment and modifications of the present invention have been disclosed in detail, it will be understood that other embodiments and modifications are contemplated by the inventor. Thus, it will be readily seen that the hydraulic piston and cylinder of FIG. 3 could be spring returned or could be hydraulically driven in both directions. Further the fluid pressure regulating structure of FIG. 4 could be used in conjunction with the servo structure of FIGS. 1 and 3 to, for example, but not limiting, maintain the pressure between the electrode and workpiece below a predetermined maximum. It is the intention to include all embodiments and modifications as suggest themselves from the disclosure within the scope of the invention as defined by the appended claims.

What I claim as my invention is:

1. Structure for the electro-erosion of electrically conducting workpieces comprising a work tank, a workpiece positioned within the work tank, dielectric fluid within the work tank, an electrode, means for supporting the electrode within the work tank partly beneath the surface of the dielectric fluid therein and in spaced relation to the workpiece to provide a machining gap between the electrode and workpiece, hydraulic piston and cylinder means for moving the electrode and the electrode supporting means toward and away from the workpiece, a dielectric fluid conduit connected to the work tank, a constant volume dielectric fluid pump in the dielectric fluid conduit for withdrawing dielectric fluid from the work tank and passing it between the electrode and workpiece under pressure, a dielectric fluid bypass conduit connected from the output side of the dielectric pump back to the work tank, a pressure regulated valve in the dielectric fluid bypass conduit for regulating the output pressure of the constant volume dielectric pump and therefore regulating the dielectric pressure between the workpiece and electrode, a pressure to electric transducer, the pressure side of which is also connected to the output side of the constant volume dielectric pump, a hydraulic fluid supply reservoir, a hydraulic fluid conduit extending between the hydraulic fluid supply reservoir and the piston and cylinder means for supplying hydraulic fluid to the piston and cylinder means operable to raise the electrode as the quantity of fluid supplied to the piston and cylinder means is increased, a constant volume hydraulic fluid pump in the hydraulic fluid conduit between the hydraulic fluid supply reservoir and piston and cylinder means, a hydraulic fluid bypass conduit connected between the output side of the constant volume hydraulic fluid pump in the hydraulic fluid conduit and the hydraulic fluid supply reservoir, an electrically actuated flow control valve in the hydraulic fluid bypass conduit for returning a variable amount of the constant volume of hydraulic fluid pumped to the hydraulic fluid supply reservoir in accordance with electrical energy passed thereto, and means connecting the electric side of the pressure to electric transducer to the electrically actuated flow control valve.

2. Structure as set forth in claim 1 wherein the pressure to electric transducer comprises a diaphragm housing, one side of which is connected in communication with the output of the constant volume dielectric pump, a linear variable differential transformer core secured to the other side of the diaphragm and a linear variable differential transformer coil secured to the other side of the diaphragm housing and receiving the core, whereby variations in pressure in the dielectric fluid between the electrode and workpiece will produce movement of the core relative to the coil, and an electrical signal proportional to the fluid pressure between the electrode and workpiece.

References Cited

UNITED STATES PATENTS

| | | |
|---|---|---|
| 2,661,460 | 12/1953 | Matthews _____ 336—30 |
| 2,841,686 | 7/1958 | Williams. |
| 2,989,616 | 6/1961 | Mironoff. |
| 3,067,358 | 12/1962 | De Maine. |
| 3,144,541 | 8/1964 | Hill. |
| 3,365,381 | 1/1968 | Fromson. |

RALPH F. STAUBLY, Primary Examiner